United States Patent [19]

Eldershaw

[11] Patent Number: 5,311,656
[45] Date of Patent: May 17, 1994

[54] KEYPAD METHOD OF MANUFACTURE

[75] Inventor: Michael K. Eldershaw, Stittsville, Canada

[73] Assignee: Mitel Corporation, Canada

[21] Appl. No.: 845,503

[22] Filed: Mar. 12, 1991

Related U.S. Application Data

[62] Division of Ser. No. 667,872, Mar. 2, 1991, abandoned.

[51] Int. Cl.[5] .............................................. H01H 11/00
[52] U.S. Cl. .................................... 29/622; 200/5 A; 264/255
[58] Field of Search ........................... 29/622; 264/255; 200/5 A, 512-517, 329-345; 235/145 R

[56] References Cited

U.S. PATENT DOCUMENTS

| | | | |
|---|---|---|---|
| 4,157,883 | 6/1979 | Mares | 264/255 |
| 4,536,625 | 8/1985 | Bebie | 200/5 A |
| 4,634,818 | 1/1987 | Hayes-Pankhurst et al. | 200/5 A |
| 4,766,271 | 8/1988 | Mitsuhashi et al. | 200/5 A X |
| 4,775,574 | 10/1988 | Fukushima et al. | 200/512 X |
| 4,862,499 | 8/1989 | Jekot et al. | 200/5 A X |

FOREIGN PATENT DOCUMENTS 78934  5/1983  European Pat. Off. ............ 264/255

*Primary Examiner*—P. W. Echols
*Attorney, Agent, or Firm*—Laff, Whitesel, Conte & Saret

[57] ABSTRACT

A keypad is comprised of a supporting frame, a plurality of snap action domes, and a plurality of pushbuttons each overlying a dome, all of the above being integrated and formed of a single piece of elastomeric material, the pushbuttons each being surrounded by a thin piece of the material buttressing the pushbutton upwardly, each of the thin pieces of material and an associated portion of the pushbutton forming a dome. The thin pieces of material extend from and are continuous with the frame. Each conducting button is disposed below a corresponding dome and is located such that when a pushbutton is pushed downwardly, its associated dome collapses, moving an associated button downwardly.

3 Claims, 3 Drawing Sheets

KEYPAD METHOD OF MANUFACTURE

This application is a division of application Ser. No. 07/667,872, filed Mar. 2, 1991, now abandoned.

FIELD OF THE INVENTION

This invention relates to keypads and a method of manufacturing keypads and keypads in association with housings.

BACKGROUND TO THE INVENTION

Certain types of electronic equipment such as calculators, telephones, etc. require a means of inputting data. A common form of these structures is comprised of a housing which retains a keypad, and a keypad which itself is formed of several piece parts. Typically the parts of the keypad are separately manufactured and the housing is injection molded, after which the parts of the keypad are assembled into the housing. In some cases the keypad parts are assembled together, after which the complete keypad is attached to the housing.

The above-described structure and assembly has been found to be labor intensive and therefore costly to manufacture. For example, each of the piece parts of the keypad must be manufactured using separate molds, often using different kinds of plastic or rubber to provide different characteristics of the various parts, and then the parts are combined into the keypad or into the housing, which is labor intensive.

SUMMARY OF THE INVENTION

According to one embodiment of the present invention, a keypad is formed by injection molding in one step, requiring no further assembly. In another embodiment, there is only one assembly step required following the injection molding of virtually the entire keypad. In another embodiment the entire keypad and housing structure is integrated into a single molded structure. The cost of manufacture is thus substantially reduced.

In accordance with one embodiment, a keypad is comprised of a supporting frame, a plurality of snap action domes, and a plurality of pushbuttons each overlying a dome, all of the above being integrated and formed of a single piece of elastomeric material, the pushbuttons each being surrounded by a thin piece of the material buttressing the pushbutton upwardly, each of the thin pieces of material and an associated portion of a pushbutton forming a dome. The thin pieces of material extend from and are continuous with the frame. Each conductive button is disposed below a corresponding dome and is located such that when a pushbutton is pushed downwardly, its associated dome collapses, moving an associated button downwardly.

In accordance with another embodiment, a method of manufacturing a structure is comprised of injection molding as a single piece part, a keypad comprising a supporting frame, a plurality of snap action domes, and a plurality of pushbuttons each overlying a dome, all of the above being integrated and formed of a single piece of elastomeric material, the pushbuttons each being surrounded by a thin piece of the material buttressing the pushbutton upwardly, each of the thin pieces of material and an associated portion of a pushbutton forming a dome. Thin pieces of material extend from and are continuous with the frame. Each conductive button ,is i below a corresponding dome. The injection molded keypad is inserted into an injection mold for a housing, and the housing is injection molded by filling the housing mold with resin to produce a combined molded keypad and housing.

Another embodiment of the invention is a method of manufacturing a structure including injection molding a housing, then inserting the housing into a mold for a keypad comprised of a supporting frame, a plurality of snap action domes, and a plurality of pushbuttons overlying the domes, all of the above being integrated and formed of a single piece of elastomeric material, the pushbuttons each being surrounded by a thin piece of the material buttressing the pushbutton upwardly, each of the thin pieces of material and an associated portion of a pushbutton forming a dome. Thin pieces of material extend from and are continuous with the frame. Conductive buttons each is disposed below a corresponding dome. The mold for the keypad is filled with plastic material to produce a combined molded keypad and housing.

BRIEF INTRODUCTION TO THE DRAWINGS

A better understanding of the invention will be obtained by reference to the detailed description below in conjunction with the following drawings, in which.

Figure 1:
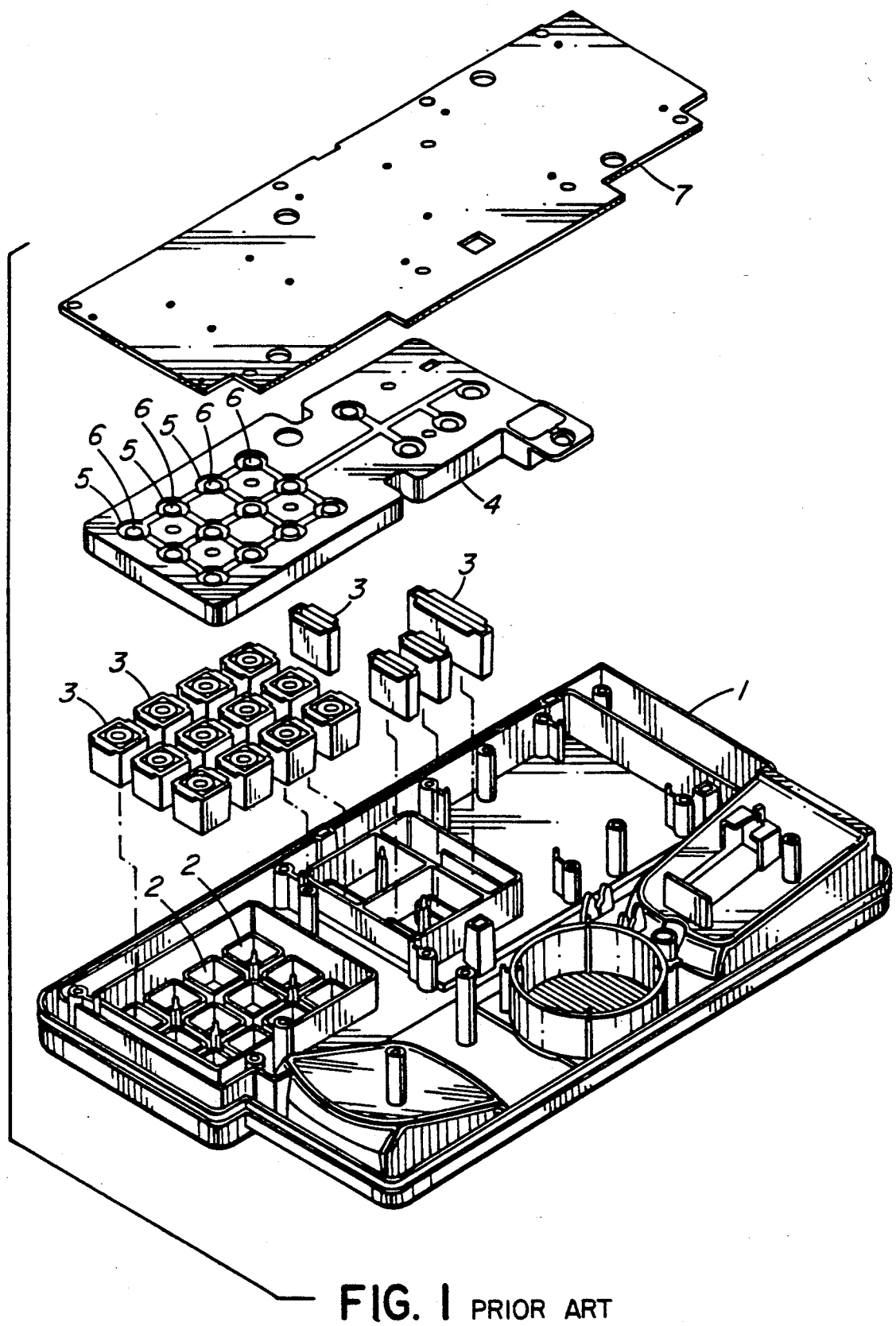
FIG. 1 is an exploded view of a prior art structure.

DESCRIPTION OF THE PREFERRED EMBODIMENTS OF THE INVENTION:

Referring first to FIG. 1, the underside of the top portion of the telephone housing 1 is illustrated. Contained within the telephone housing are plural rectangular channels 2, which are formed and are spaced to accommodate the travel of numeric and function pushbuttons 3. These pushbuttons are placed into the housing channels 2.

A rubber dial pad 4 contains snap action domes 5, within which conductive buttons 6 are located. The rubber dial pad with the rubber domes and contacts is placed in the housing over the pushbuttons.

A printed circuit board 7 on which have been screened conductors on its side facing the contacts (not shown) is positioned over the rubber dial pad, and is fastened to the housing. The pushbuttons and rubber dial pad are captured between the housing and printed circuit board, which creates a keypad.

Pushbutton travel is guided by ribs or surrounds in the housing, e.g. forming the channels 2. When the pushbutton is pressed by the user, the associated rubber dome collapses and the conductive (or resistive) contact touches a pair of screened conductors carried by the printed circuit board, creating a conductive path. The resulting change in resistance between the contacts is sensed by an electronic circuit which is in communication with the contacts, which reacts as a result of actuation of the pushbutton. The force/displacement characteristics are controlled by the shape of the rubber dome.

It may be seen that the structure involves the separate piece parts of a housing, separate pushbuttons, a rubber dial pad, conductive contacts which may or may not be part of the rubber dial pad, and a printed circuit board.

Figure 2:
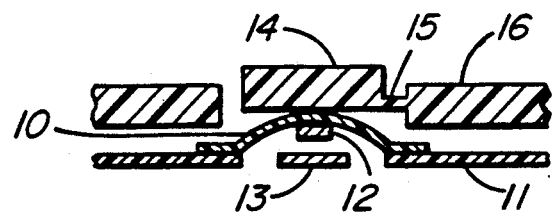
FIG. 2 is a cross-section of a prior art form of key button which is different than the form shown in FIG. 1, FIGS. 3A and 3B are cross-sections of a keypad in accordance with embodiments of the present invention.

Another form of prior art pushbutton is shown in cross-section in FIG. 2. A rubber dome 10 is supported by a supporting structure 11, which may be a frame, a printed circuit board, or the like. Under the rubber dome a conductive, button 12 is supported. The conductive button is spaced from a pair of contacts generally shown as 13. When the dome is pressed from above and collapses, the conductive button 12 makes contact with conductive contacts 13, providing a conductive (or resistive) path between the contacts.

A pushbutton 14 is attached via a cantilever 15 at one side thereof to a frame 16. While the frame 16 can generally surround pushbutton 14, pushbutton 14 is only attached along one side. This allows the pushbutton to flex relative to frame 16, allowing pressure to be exerted against the dome 10, causing it to collapse.

In this prior art form of pushbutton for use in a keypad, while the pushbutton is integrated and can be formed of the same material as the frame 16, the array of domes is formed of separate pieces, resulting in a keypad that must be assembled out of many pieces, and is separate from the housing.

Figure 3A:
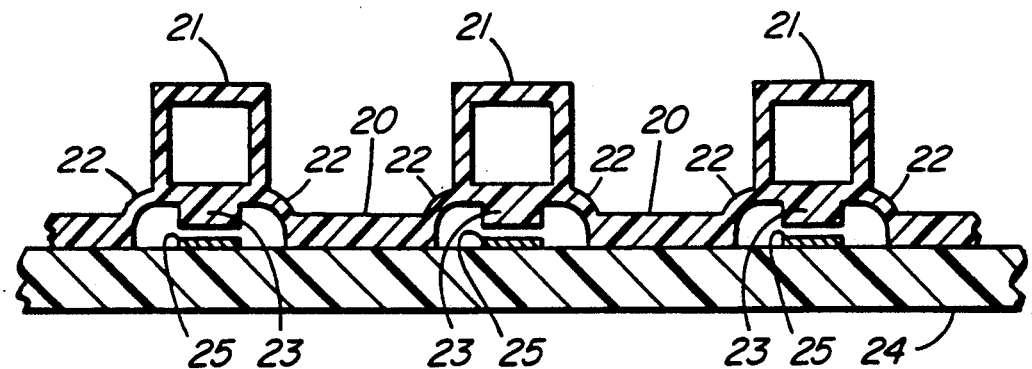
Figure 3B:
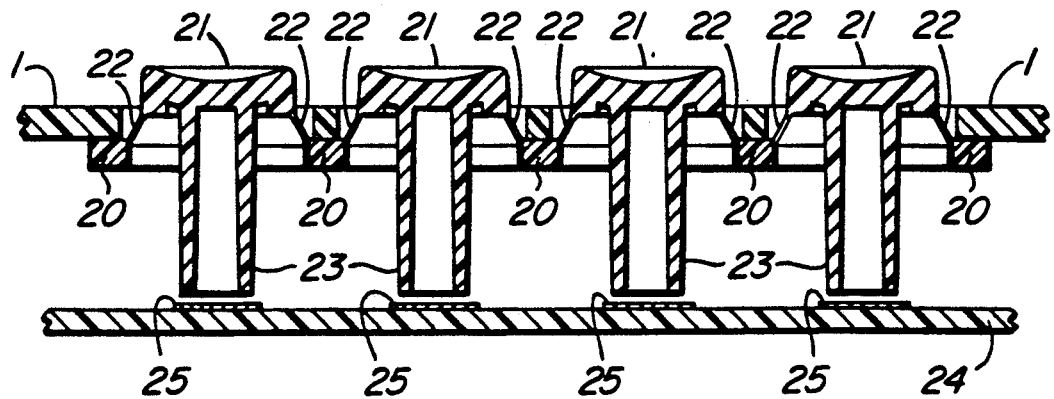

FIGS. 3A and 3B are cross-sections of a keypad in accordance with the present invention. The keypad is formed of a supporting frame 20, a plurality of pushbuttons 21, and a plurality of domes, the pushbuttons overlying the domes, all being integrated and formed of a single piece of material. Each elastomeric pushbutton 21 is surrounded by a thin piece of the elastomeric material 22, which buttresses the pushbutton upwardly. Each of the surrounding piece of material and an associated portion of the pushbutton form the domes. The pieces of material 22 extend from and are continuous with the frame, which may be made of plastic.

It should be noted that the location at which the buttressing pieces of elastomeric material, while being shown joined to the pushbuttons at the bottom edge thereof in FIG. 3A, can be attached at any location around the sides thereof, e.g. as shown in FIG. 3B. Thus the pushbutton can have its bottom edge or a skirt extending from the bottom, extending below the position where the buttressing portion of the elastomeric material joins the associated pushbutton.

It should be noted that the thin piece of material buttressing the pushbutton upwardly should preferably completely surround the pushbutton, in order to form a dome. Alternatively the buttressing material can stretch along part of each of the four sides of a pushbutton which is generally square or rectangular or along two of the opposite long sides of an elongated pushbutton, or can be spaced at various positions (e.g. three positions) around a round pushbutton, or at other positions between the frame 20 and the pushbutton in accordance with other designs. It is desirable that there should be an offsetting pressure between the one side of the buttressing elastomeric material against the other, in order that the effect of the snap action dome should be obtained and to keep the pushbutton from tilting. In this patent application, it is intended therefore that the word dome should be construed as meaning all such structures, and not be restricted to a generally rectangular or circular dome shape.

Conductive buttons 23 extend downwardly from the bottom of the dome thus formed, i.e. the bottom of pushbutton 21.

A printed circuit board 24 supports pairs of conductors 25 facing and spaced from the conductive buttons 23, but located immediately below the buttons and also supports the frame 20. While a printed circuit board 24 is preferred in order that the frame 20 can be supported thereby, other means for supporting the conductors can be utilized. For example, the conductors can themselves be stiff pairs of wires extending below the conductive button 23, and the frame 20 can be supported by other means, for example being self-supporting.

It should be noted that it is preferred that the conductive buttons 23 should be molded in the same integrated structure, and be formed of the same material (although doped to be conductive) as the pushbuttons and skirt, i.e. elastomeric material. Alternatively, rather than doping the buttons 23 so as to become conductive, conductive elastomeric material can be molded as a surface layer thereon. As another alternative conductive or resistive material can be painted on or adhered to their surfaces.

In operation, a pushbutton 21 is pushed by a user, causing collapse of the dome formed of elastomeric material 22 with pushbutton 21, causing the conductive button 23 to come into contact with the pair of contacts 25 below. This creates a conductive path, allowing an electronic circuit connected thereto to sense depression of the pushbutton.

The integrated keypad is preferred to be injection molded as a single piece part, the buttons and skirt being of elastomeric material and the frame of plastic, although the frame may also be made of elastomeric material. That completed piece part is then inserted into an injection mold for a housing. The housing is then injection molded by filling the mold with resin, preferably thermoplastic resin, to provide a combined molded keypad and housing. The result is illustrated in FIG. 4.

Figure 4:
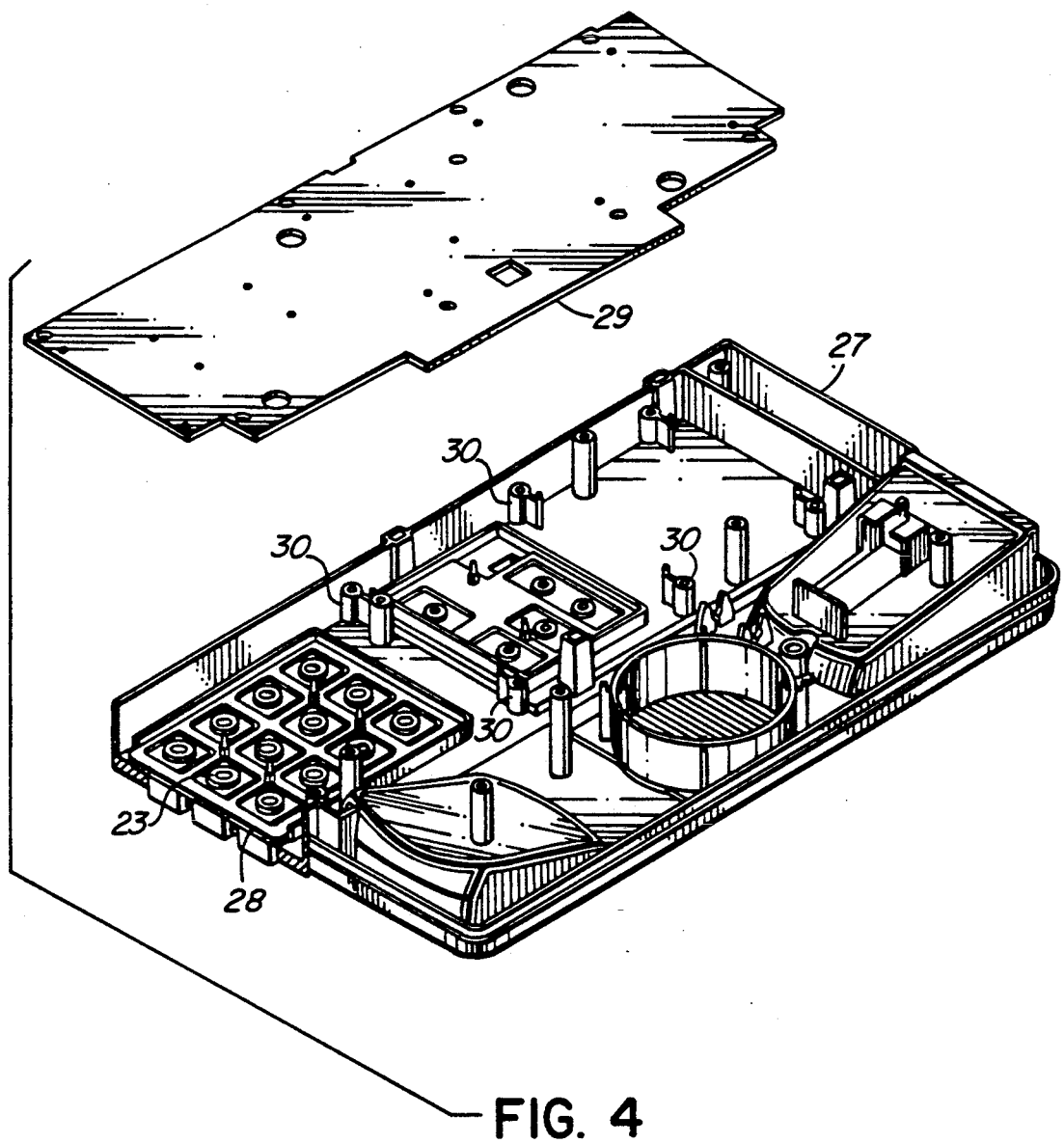
FIG. 4 is an exploded view of a keypad and housing combination in accordance with an embodiment of the present invention.

In FIG. 4 the underside of the top portion of a telephone housing 27 is shown combined with an integrated one-piece keypad 28 which has been produced in the aforenoted manner. A printed circuit board 29 on which pairs of conductors have been screened or etched on the side to face the conductive buttons 23, is placed over the combined molded structure, by fastening to standoffs 30. Thus it may be seen that aside from the injection molding, only a single assembly step is required, that of attaching the printed circuit board 29 to the housing 27. The structure will operate as described above with respect to FIG. 3.

The top faces of the pushbuttons can be decorated using sublimation printing or screen printing for example.

The force/displacement characteristics and life expectancy of the pushbuttons formed by the present invention are controlled by the dome shape, i.e. the buttressing skirt around the pushbutton perimeter. The pushbutton shape will also affect these parameters. The tactile feel has the desirable snap action preserved as the dome collapses, which has been found to be excellent.

An alternative manner of manufacture of the invention is to reverse the process, that of first molding the housing and then inserting the molded housing into a mold in which the dial pad is to be molded, and then molding the keypad integrating it with the housing.

Another manner of molding the dial pad into the housing is to inject the dial pad material followed by an injection of housing material into the same mold, or vice versa.

Rather than printing the top face of the key button, a two shot process can be used, the first providing a decorative layer for the pushbuttons, following which the remainder of the keypad is molded in one integrated unit.

It should be noted that if, because of manufacturing limitations, the conductive buttons cannot be molded at the same time as the remainder of the integrated key pad, they may be separately manufactured and then fastened, e.g. by adhesion, to the underside of each pushbutton.

While the description above has been directed to the manufacture of a telephone keypad and/or keypad and housing, it is not restricted thereto. The same structure and method of manufacture can be used for other apparatus, e.g. calculators, computer keyboards, etc.

A person skilled in the art understanding this invention may now conceive of variations or other embodiments using the principles of the invention described herein. All are considered to be within the scope of the invention as defined in the claims appended hereto.

I claim:

1. A method of manufacturing a structure comprising: injection molding with elastomeric material as a single piece part, a keypad comprising a plurality of snap action domes, and a plurality of pushbuttons overlying the domes, the pushbuttons each being surrounded by a thin piece of elastomeric material buttressing the pushbutton upwardly, each said thin piece of material and an associated portion of a pushbutton forming a dome, and conductive buttons each being disposed below a corresponding dome; inserting the injected molded keypad into an infection mold for a housing and frame; and injection molding the housing by injecting plastic resin into the housing and frame mold to provide a combined molded keypad and housing, and including the step of injection molding a frame for the keypad prior to or following the housing by injecting plastic resin into the mold for the housing and frame to provide a combined keypad frame for the keypad and housing as a single piece part, wherein said thin pieces of material extend from and are continuous with the frame, the pushbuttons, said thin pieces of material and domes being formed of elastomeric material and the frame and housing being formed of plastic.

2. A method of manufacturing an integrated keypad comprised of a supporting frame, a plurality of snap action domes, and a plurality of pushbuttons extending upwardly from the domes, each pushbutton being surrounded by a thin piece of material buttressing it upwardly, each said thin piece of material and a portion of an associated pushbutton forming a dome, said thin pieces of material extending from and being continuous with said frame, and conductive buttons each being disposed below a corresponding dome; comprising filling a mold with elastomeric material to produce said domes, pushbuttons, and material buttressing the pushbuttons, then filling the remainder of the mold with plastic resin to form the frame and thus produce an integrated elastomeric keypad with a plastic frame.

3. A method of manufacturing a structure comprising: injecting molding as a single piece part using elastomeric material, a keypad comprising a supporting frame, a plurality of snap action domes, and a plurality of pushbuttons overlying the domes, the pushbuttons each being surrounded by thin pieces of elastomeric material buttressing it upwardly, each said thin piece of material and an associated portion of a pushbutton forming a dome, said thin pieces of material extending from and being continuous with said frame, and conductive buttons each being disposed below a corresponding dome; inserting the injection molded keypad into an injection mold for a housing; and injection molding the housing by filling the housing mold with plastic resin to provide a combined keypad and housing as a single piece part wherein the pushbuttons, domes and frame are formed of elastomeric material and the housing is formed of plastic.

* * * * *